United States Patent [19]

Araki et al.

[11] Patent Number: 5,102,165

[45] Date of Patent: Apr. 7, 1992

[54] AUTOMATIC SEAT BELT SYSTEM

[75] Inventors: Hidemoto Araki; Kenji Matsui, both of Aichi, Japan

[73] Assignee: Kabushiki Kaisha Toka-Rika-Denki-Seisakusho, Aichi, Japan

[21] Appl. No.: 679,311

[22] Filed: Apr. 2, 1991

[30] Foreign Application Priority Data

Apr. 4, 1990 [JP] Japan ................................ 2-36374[U]

[51] Int. Cl.$^5$ ............................................ B60R 22/06
[52] U.S. Cl. ..................................... 280/804; 297/473
[58] Field of Search ........................ 280/804, 802, 801; 180/268, 282; 297/468, 469, 473, 482

[56] References Cited

U.S. PATENT DOCUMENTS

| | | | |
|---|---|---|---|
| 4,653,774 | 3/1987 | Morner | 280/804 |
| 4,809,809 | 3/1989 | Hane | 280/804 |
| 5,004,268 | 4/1991 | Yamamoto | 280/804 |

*Primary Examiner*—Joseph E. Valenza
*Assistant Examiner*—Kenneth Noland
*Attorney, Agent, or Firm*—Sixbey, Friedman, Leedom & Ferguson

[57] ABSTRACT

An automatic seat belt system, having; a guide rail disposed in a room of a vehicle, a slider engaged with one end of a webbing for restraining an occupant of the vehicle and guide by the guide rail in a manner capable of moving therealong between a webbing-application canceling position and a webbing applying position, and a slider retaining member which engages with the slider and retains thereof at the webbing applying position and which enables to alter the retaining position while retaining the slider. The automatic seat belt device further comprises a connecting mechanism, having; a first elongated member arranged along the longitudinal direction of the guide rail and a part of which is anchored to the slider, a second elongated member whose one end face is faced to an end face of the first elongated member from the direction from the webbing applying position to the webbing-application canceling position and which is moved in a first direction in which the one end face approaches to the end face of the first elongated member by means of driving force of a driving source and in a second direction which is the reverse direction thereof, and an abutting section which is located between the first elongated member and the second elongated member.

18 Claims, 11 Drawing Sheets

AUTOMATIC SEAT BELT SYSTEM

BACKGROUND OF THE INVENTION

1. Field of the Invention

The present invention relates to an automatic seat belt system, and particularly to an automatic seat belt system having a mechanism of adjusting the height of a webbing worn by a seat occupant of a vehicle.

2. Description of the Related Art

In an automatic seat belt system of this type, one end of a webbing is anchored to a slider which is arranged to be capable of moving along a guide rail. The slider is linked to a motor through a flexible tape or a wire as an elongated member so as to be moved along the guide rail when the motor rotates.

Moreover, a slider retaining member (shoulder anchor) is arranged at the vehicle rearward side of the guide rail. The shoulder anchor is connected to a reinforcement member at the side wall of the vehicle body and is engaged with the slider so as to be above to retain it. The shoulder anchor is also arranged so as to be able to alter the connecting position with the reinforcement member along the guide rail.

When an occupant seats on a vehicle seat and closes a door of the vehicle, the motor is driven and the slider moves along the guide rail in the rearward direction of the vehicle. The slider then abuts against the shoulder anchor and is retained thereby, causing the webbing to be applied to the occupant.

By changing the connecting position of the shoulder anchor by manual operation, the occupant can also adjust the retaining position of the slider, i.e., the height of the webbing worn by the occupant, enabling even an occupant with a different type of physical build to obtain an optimum webbing fastened state.

In such an automatic seat belt device having the prior art webbing fastening height adjustment mechanism, however, the slider retained by the shoulder anchor is linked to the motor through the flexible tape or the wire cable as described above, so that the motor also rotates through the flexible tape or the wire cable when the occupant moves the shoulder anchor together with the slider along the guide rail in order to adjust the height of the webbing worn. A large operating physical force is required for that, hence causing a defect that the height of the webbing worn cannot be adjusted readily. Especially when a reduction gear adapted to the motor is one having a structure not to be able to reverse the rotation, the shoulder anchor may not be moved causing the webbing fastening height not be able to be adjusted.

SUMMARY OF THE INVENTION

It is accordingly an object of the present invention to obtain an automatic seat belt system wherein an operating force required for adjusting the height of a webbing worn can be reduced by allowing to separate elongated members for moving a slider and wherein a separating-/connecting section of the elongated members is assured to have enough strength.

To this end, according to the present invention, there is provided an automatic seat belt system, comprising:

a guide rail disposed in a vehicle compartment;

a slider which is connected to one end of a webbing and which is guided by the guide rail in a manner capable of moving between a webbing-application canceling position and a webbing applying position;

a slider retaining member which engages with the slider and retains thereof at the webbing applying position and which is capable of moving along the longitudinal direction of the guide rail while retaining the slider;

a first elongated member which is arranged along the longitudinal direction of the guide rail and a part of which is anchored to the slider;

a second elongated member whose one end face approximately faces to an end face of the first elongated member and which is moved in a first direction in which the one end face approaches to the end face of the first elongated member and in a second direction which is the reverse direction thereof by means of a driving force of a driving source;

connecting means, comprising a connecting section connected to the first elongated member by plural points, an abutting section located between the end face of the first elongated member and the one end face of the second elongated member, and an engaging section engaged with the second elongated member by plural points in a manner capable of releasing thereof, which moves the slider in the direction of the webbing-application canceling position by a pressing force through the intermediary of the abutting section and the first elongated member during when the second elongated member moves in the first direction and which moves the slider in the direction of the webbing applying position by a tensile force through the intermediary of the engaging section and the first elongated member during when the second elongated member moves in the second direction; and releasing means supported by the slider retaining member, which releases the engagement of the engaging section with the second elongated member at the webbing applying position of the slider.

According to an automatic seat belt system with the above-described construction, when the slider is positioned at the webbing-application canceling position, i.e., before the occupant on the vehicle applies the webbing to him or her, the first elongated member and the second elongated member are connected by means of an engagement of the engaging section of the connecting means anchored to the first elongated member and the second elongated member. In this state, when the second elongated member is moved by the driving source in the second direction, i.e., in the direction of the webbing applying position, the first elongated member is moved to the second direction through the intermediary of the connecting means and the slider is moved to the webbing applying position, thereby causing the webbing to be applied to the occupant on the vehicle. At this time, the connecting means is anchored to the first elongated member by plural points through the intermediary of the connecting section thereof and engaged with the second elongated member in plural points through the intermediary of the engaging section, so that the connecting part of the first and the second elongated members by means of the connecting means is assured to have enough strength and the tensile force of the second elongated member is faithfully transmitted to the first elongated member. Thus the slider moves properly.

The engagement of the engaging section and the second elongated member of the connecting means is released at the webbing applying position of the slider.

That is, the first elongated member and the second elongated member are separated from each other. Accordingly, the webbing applying position can be altered just by moving the slider retaining member together with the slider and the first elongated member and the force for altering the retaining position is not transmitted to the driving source. Thus the slider retaining member can be moved together with the slider and the first elongated member to the position where the occupant desires with a small operating force and the height of the webbing worn by the occupant can be adjusted readily.

When the slider is moved from the webbing applying position to the webbing-application canceling position, i.e., when the occupant cancels the application of the webbing, the second elongated member is moved in the first direction, i.e., to the webbing-application canceling position, by the driving source and the one end face presses the abutting section of the connecting means, causing also the first elongated member anchored to the connecting means to be moved in the first direction. As a result, the slider reaches to the webbing-application canceling position. At this time, the one end of the second elongated member abuts against and presses the abutting section provided in the connecting means and the pressing force is transmitted to the first elongated member, that is, the second elongated member will not directly abut against the first elongated member, so that the first elongated member and the second elongated member will not deflect unnecessarily even in high temperature condition and the connecting part of the first and the second elongated members is assured to have enough strength. Accordingly, the pressing force of the second elongated member is faithfully transmitted to the first elongated member, causing the slider to be moved properly.

As described above, an automatic seat belt system in accordance with the present invention enables to readily adjust the height of the webbing worn by the occupant by permitting to separate the elongated members for moving the slider to reduce the operating force required when moving the slider retaining member, and assures enough strength on the separation/connecting section of the elongated member.

DETAILED DESCRIPTION OF PREFERRED EMBODIMENT

Figure 2:
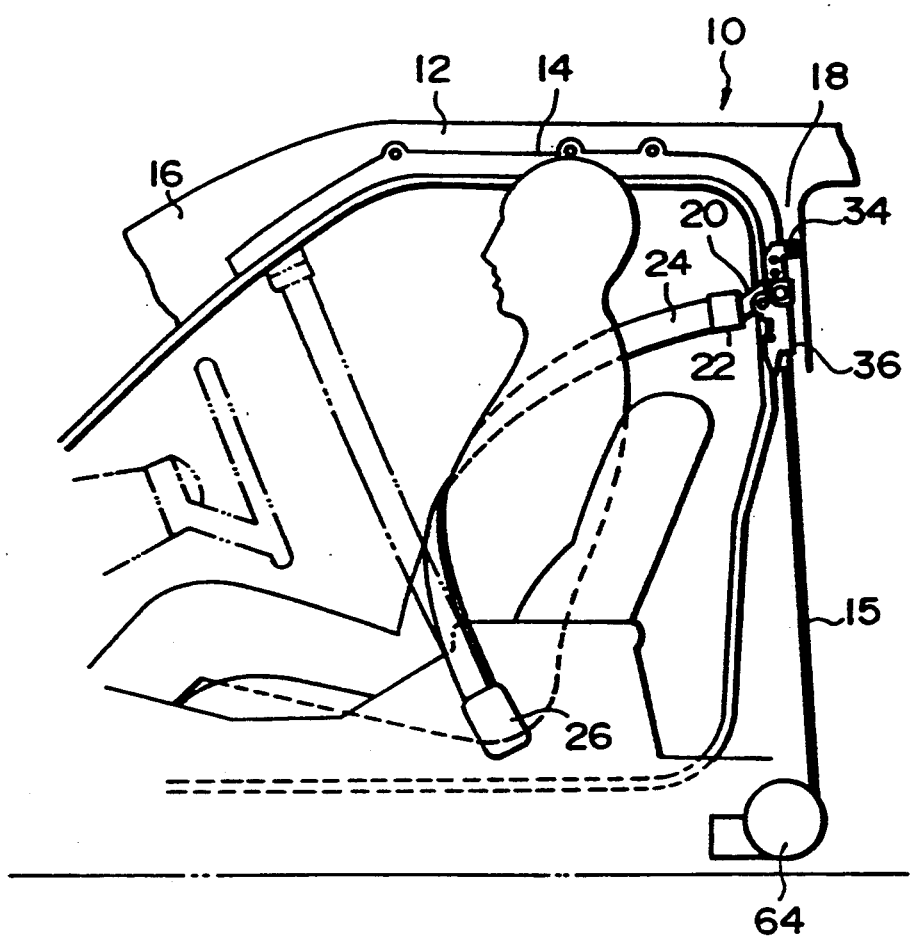
FIG. 2 is a schematic view of an entire automatic seat belt system.

FIG. 2 is a schematic view of an entire automatic seat belt system in accordance with the first preferred embodiment of the present invention.

As shown in FIG. 2, a guide rail 14 is installed on the roof side 12 of a vehicle. A vehicle front side portion of the guide rail 14 is extended along a front pillar 16 and a vehicle rear side portion of the guide rail 14 is arranged along a center pillar 18, bent approximately at a right angle. A slider 20 is fitted into this guide rail 14 in such a manner as to be able to slide therein.

An outer end of a webbing 24 is engaged with a tip portion of the slider 20 through the intermediary of a buckle 22 and the inner end of the webbing 24 is wound up in layers and accommodated in a webbing retractor 26 which is attached to a vehicle body in the middle section thereof. The webbing retractor 26 includes a built-in inertia lock mechanism adapted to instantaneously restrain a pulling-out of the webbing 24 whenever it detects any vehicular emergency by means of an acceleration sensor.

Figure 1:
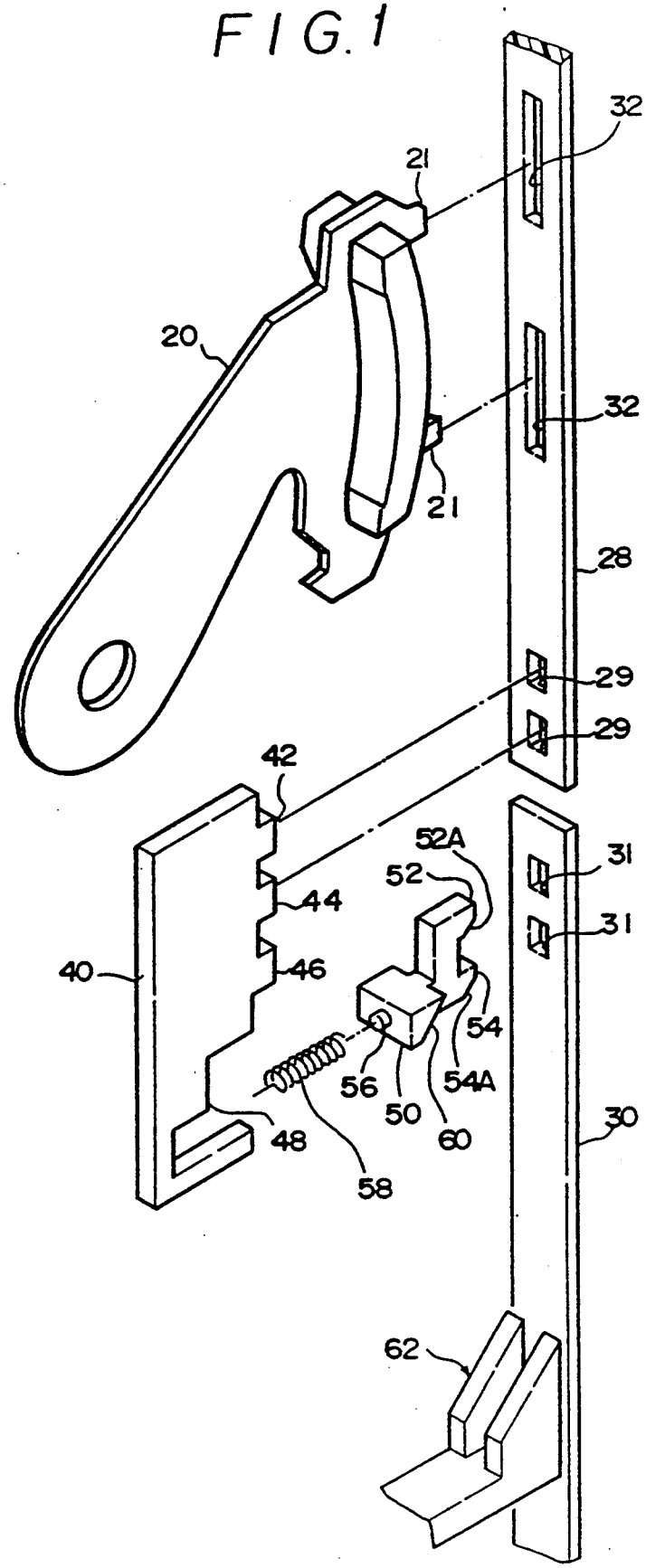
FIG. 1 is an exploded perspective view around a connecting part of tapes of an automatic seat belt system accordance with the first embodiment of the present invention.

Moreover, a pate 28 as a first elongated member and another tape as a second elongated member which are connected by a connecting means described later are accommodated in the guide rail 14 in a manner slidable therein. As shown in FIG. 1, adjacent lengthy holes 32 are formed on the tape 28 along the longitudinal direction. Projections 21 of the slider 20 are inserted to connect therewith, thereby causing the slider 20 to move along the guide rail 14 following to the movement of the tape 28.

A reinforcement 34 is arranged at the vehicle rearward portion of the guide rail 14 and fixed to a side wall of the vehicle body. A movable plate 36 which constitutes a slider retaining member is arranged on the peripheral portion of the reinforcement 34 along the longitudinal direction thereof (vertical direction in FIG. 2) in a manner slidable therein for a certain length. The movable plate 36 is capable of retaining the slider 20 by engaging therewith and of altering the retaining position thereof that is, the connecting position to the reinforcement 34 by sliding along the reinforcement 34.

As shown in FIG. 1 in detail, a lost motion piece 40 is attached at the lower end portion of the tape 28 as a first connecting member which constitutes a part of the connecting means. The lost motion piece 40 has a rectangular plate shape with a pair of protrusions 42, 43 protruded near one end portion in the longitudinal direction. These protrusions 42, 43 correspond with adjacent openings 29 formed on the tape 28 in the longitudinal direction of the lost motion piece 40. The protrusions 42, 43 are inserted to the openings 29 and, thereby the lost motion piece 40 is anchored to the tape 28.

An abutting section 46 which protrudes in the same direction with the protrusions 42, 43 is formed approximately at the middle section of the lost motion piece 40 in the longitudinal direction. This abutting section 46 is located at the further forward position from the tip portion of the tape 28 in a state when the protrusions 42, 44 are inserted to the openings 29 and the lost motion piece 40 is anchored to the tape 40.

An accommodating section 48 is formed on the other end of the lost motion piece 40 in the longitudinal direction which is opened to the tape 28 side (i.e., the side which the abutting section 46 and the protrusions 42, 43 protrude). A lock piece 50 as a second connecting member which constitutes a part of the connecting means is accommodated in the accommodating section 48.

The lock piece 50 is a block member which is arranged in the accommodating section 48 of the lost motion piece 40 in a manner slidable therein. A pair of engaging sections 52, 54 are formed protruding from the one end portion of the lock piece 50 (the end portion of the side where the accommodating section 48 opens). Those engaging sections 52, 54 correspond with openings 31 formed on the upper end portion of the tape 30 and tilting faces 52A, 54A which tilt along the moving direction of the lock piece 50 (the lost piece 40 and the tape 28) are formed on the tips of the engaging sections 52, 54, respectively. The engaging sections 52, 54 are arranged such that they are inserted to the openings 31, respectively, in a state when the lock piece 50 protrudes out of the accommodating section 48. When the engaging sections 52, 54 are inserted to the openings 31, the tape 30 is connected to the lost piece 40 through the intermediary of the lock piece 50, thereby causing the tape 28 to be moved in conjunction with the tape 30.

An another protrusion 56 is formed on the lock piece 50 on the other end on the side of the accommodation section 48 and a compression coil spring 58 is arranged between the lock piece 50 and the accommodating section 48 in a manner anchored to the protrusion 56. The compression coil spring 58 always urges in such a direction that the lock piece 50 is protruded out of the accommodating section, i.e., in the direction for the engaging sections 52, 54 to be inserted to the openings 31 of the tape 30.

A tilt portion 60 which tilts along the moving direction of the lost motion piece 40 and the tape 28 is formed in the middle of the lock piece 50. This tilt portion 60 is capable of engaging with a release piece 62 as a releasing means.

The release piece 62 is formed in a wedge shape and is attached at the lower end portion of the movable plate 36. The release piece 62 is located on the traveling track of the lost motion piece 40 and the lock piece 50 which move together with the tape 28. Accordingly, when the lost motion piece 40 and lock piece 50 drop down together with the tape 28 from the upper section of the guide rail 14, the tilt portion 60 of the lock piece 50 abuts against the release piece 62 and along the further downward movement, the lock piece 50 is moved against an urging force of the compression coil spring 58 in the inner direction of the accommodating section 48, i.e., in the direction which the engaging sections 52, 54 is released from the openings 31 of the tape 30.

The tape 30 which extends out of the end portion of the guide rail 14 by being connected to the tape 28 through the intermediary of the lock piece 50 and lost motion piece 40 is linked, as shown in FIG. 2, to a driving device 64 which is constituted by a motor as a driving source and others by being guided by an auxiliary guide 15 extended from the guide rail 14. This causes the tape 30 to be moved by a driving force of the driving device 64.

Description will be made hereinafter of the operation of the first embodiment.

Figure 3A:
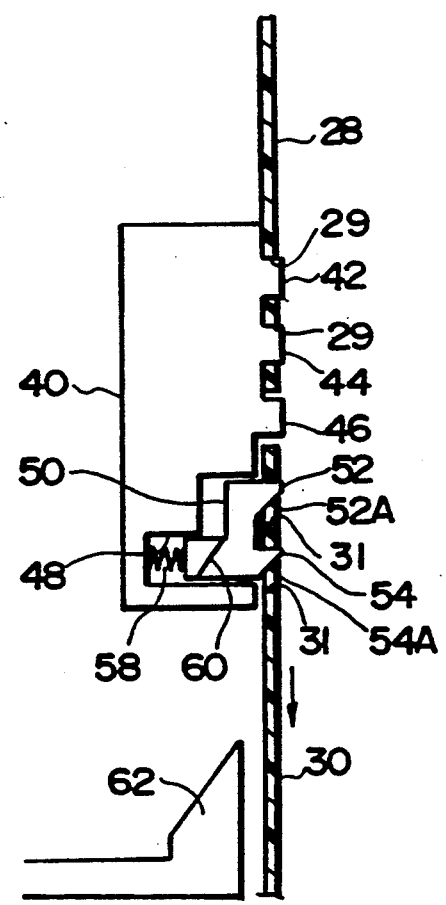
FIGS. 3(A) to 3(D) are sectional views illustrating each connecting condition of operations of a lock piece and tapes in accordance with the first embodiment of the present invention.

When the occupant is seated on the seat, the slider 20 is positioned at the vehicle forward end portion of the guide rail 14 and the engaging sections 52, 54 of the lock piece 50 are inserted to the most upward section of the openings 31 formed on the tape 30 by means of the urging force of the compression coil spring 58 (as shown in FIG. 3(A). Accordingly, the tape 30 is connected to the tape 28 through the intermediary of the lock piece 50 and the lost motion piece 40. The driving device 64 is also stopped. A wide space has been created between the webbing 24 and the seat, so that the occupant is readily able to seat on the seat.

When the occupant is seated on the seat and closes the door, a door switch (not shown) is operated, causing the driving device 64 to rotate in the forward direction. At this moment, since the tape 30 linked to the driving device 64 is connected to the tape 28 through the intermediary of the lock piece 50 and the lost motion piece 40, a driving force of the driving device 64 is transmitted to the tape 28 through the intermediary of the tape 30, thereby causing a tensile force to be generated on the tape 28. This causes the slider 20 to be moved to the vehicle rear side along the guide rail 14. When the slider 20 is moved to the vehicle rear side together with the tapes 28 and 30, the webbing connected to the slider 20 is also moved thereafter.

When the slider 20 keeps moving and reaches to the vehicle rear end portion of the guide rail 14, the slider 20 is engaged with the movable plate 36 to be locked strongly. Simultaneously with this, a rear end switch (figure omitted) is operated causing the driving device 64 to be stopped and thereby stopping the movement of the tapes 30 and 28. This causes the occupant to be fastened by the webbing 24.

At this time, since the lost motion piece 40 is fixed to the tape 28 (the openings 29) by plural points (the protrusions 42, 44) and the lock piece 50 is engaged with the tape 30 (the openings 31) by plural points (the engaging sections 52, 54), the connecting part by means of the lost motion piece 40 and the lock piece 50 is assured to have enough strength and the tensile moving force of the tape 30 is faithfully transmitted to the tape 28. Thus the slider is also moved properly.

Figure 3B:
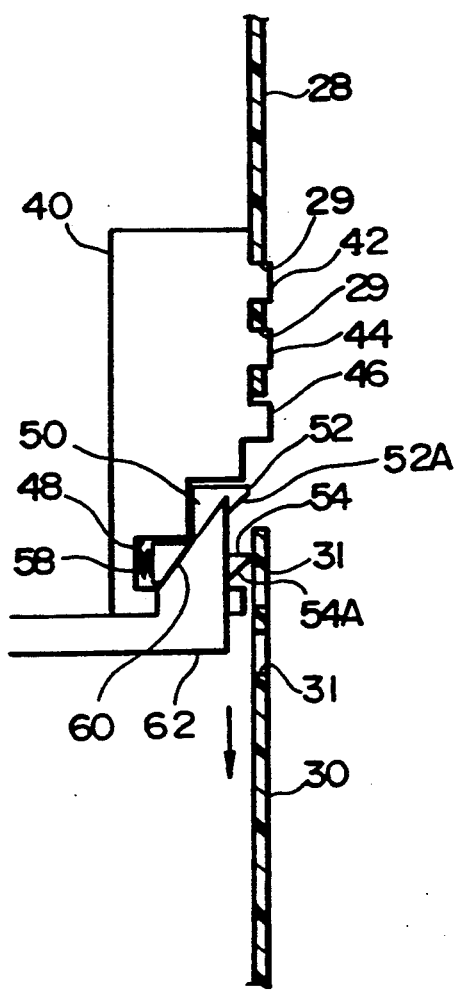

Then, when the slider 20 is retained by the movable plate 36, the release piece 62 abuts against the tilt portion 60 of the lock piece 50 along the movement of the tapes 30 and 28. When the downward movement of the tapes 28 and 30 further progresses, the release piece 62 moves the lock piece 50 toward the inner direction of the accommodating section 48, i.e., in the direction which the engaging sections 52, 54 are released from the openings 31, resisting against the urging force of the compression coil spring 58, as shown FIG. 3(B). This causes the connection of the tape 30 and the tape 28 to be released and the tape 30 is separated from and becomes independent of the tape 28.

Accordingly, even when the movable plate 36 is moved together with the slider 20 and the tape 28 in order to alter the retaining position of the slider 20, the moving force thereof will not be transmitted to the driving device 64 through the intermediary of the tape 30. Thus the movable plate 36 may be moved to the position where the occupant desires together with the slider 20 and the tape 28 with a light operating physical force, which enables to adjust the height of webbing worn readily.

Figure 3C:
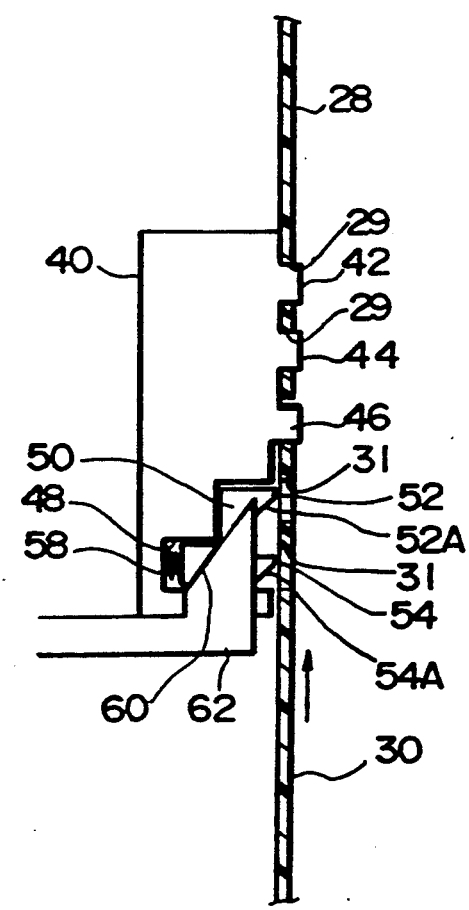
Figure 3D:
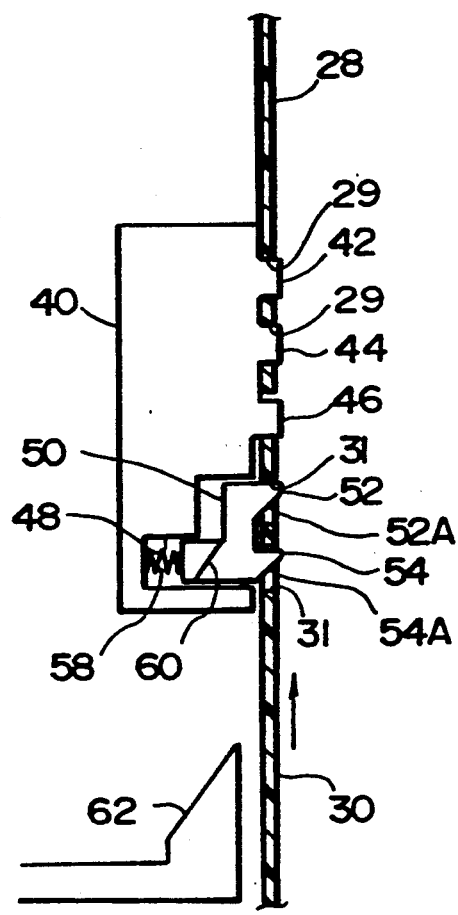

When the occupant releases the wearing of the webbing 24, the driving device 64 is operated and the tape 30 is moved in the direction reverse to the one during webbing application. When the movement of the tape 30 further progresses in this time, the tip portion of the tape 30 abuts against the abutting section 46 of the lost motion piece 40 and directly presses the abutting section 46 as shown in FIG. 3(C). This causes the pressing moving force to be transmitted to the tape 28 through the intermediary of the lost motion piece 40 and the tape 28 to be moved together with the lost motion piece 40. Then, along the movement of the lost motion piece 40, the lock piece 50, which has been in a condition of being accommodated in the accommodating section 48, comes out of the accommodating section 48 gradually by means of the urging force of the compression coil spring 58 and the engaging sections 52, 54 are inserted to the openings 31 of the tape 30 as shown in FIG. 3(D). This causes the tape 28 and the tape 30 to be connected again and the tape 28 moves to the vehicle forward side together with the slider 20, thereby creating a state wherein wearing of the webbing 24 is released.

At this time, since the tape 30 will not abut directly against the tape 28 (tape 30 abuts against and presses the abutting section 46 of the lost piece 40), as shown in FIG. 3(D), the tape 28 and tape 30 will not unnecessarily deflect even in high temperature condition and the connecting part of the tape 28 and the tape 30 can be assured to have enough strength. Accordingly, the pressing moving force of the tape 30 is faithfully transmitted to the tape 28 and the slider 20 is moved properly.

The slider 20 is successively moved to the vehicle forward side and when it reaches to the vehicle forward end portion of the guide rail 14, the driving device 64 is stopped. This causes a wide space to be created between the webbing 24 and the seat, allowing the occupant to leave the seat.

It will be apparent that in the present embodiment, even when the movable plate 36 is moved together with the slider 20 and tape 28, the moving force is not transmitted to the driving device 64 through the intermediary of the tape 30 because the connection between the tape 28 and the tape 30 through the intermediary of the lost motion piece 40 and the lock piece 50 is released after when the slider 20 is retained by the movable plate 36 the webbing is worn. Accordingly, this allows the occupant to move the movable plate 36, together with the slider 20 and the tape 28, to the position where he desires with a small operating force and to readily adjust the webbing wearing height.

It will also be apparent that the connecting part by means of the lost motion piece 40 and the lock piece 50 is assured to have enough strength and that the tensile moving force of the tape 30 is transmitted faithfully to the tape 28 because the lost motion piece 40 is fixed to the tape 28 by plural points and the lock piece 50 is engaged with the tape 30 by plural points.

It will further be apparent that the pressing moving force of the tape 30 is faithfully transmitted to the tape 28, the tapes 28 and 30 will not deflect unnecessarily even in high temperature condition and the connecting part of the tape 28 and the tape 30 is assured to have enough strength because the tape 30 abuts against the abutting section 46 of the lost motion piece 40 and presses the tape 28 without directly abutting against thereto.

While the present embodiment has been described as having a structure wherein the lost motion piece 40 is fixed to the tape 28 (the openings 29) with two protrusions 42 and 43 and the lock piece 50 is engaged with the tape 30 in two engaging sections 52 and 54, the scope of the invention is not limited thereto and a structure may be adopted wherein three or more protrusions or engaging sections are formed, thereby connecting each tape at three or more points. It will permit to enhance the strength of the connecting part further.

The operation of the second embodiment of the present invention will now be described. For parts basically identical to those in the first embodiment aforementioned, identical reference characters with those in the first embodiment will be given and description thereof will be omitted.

Figure 4:
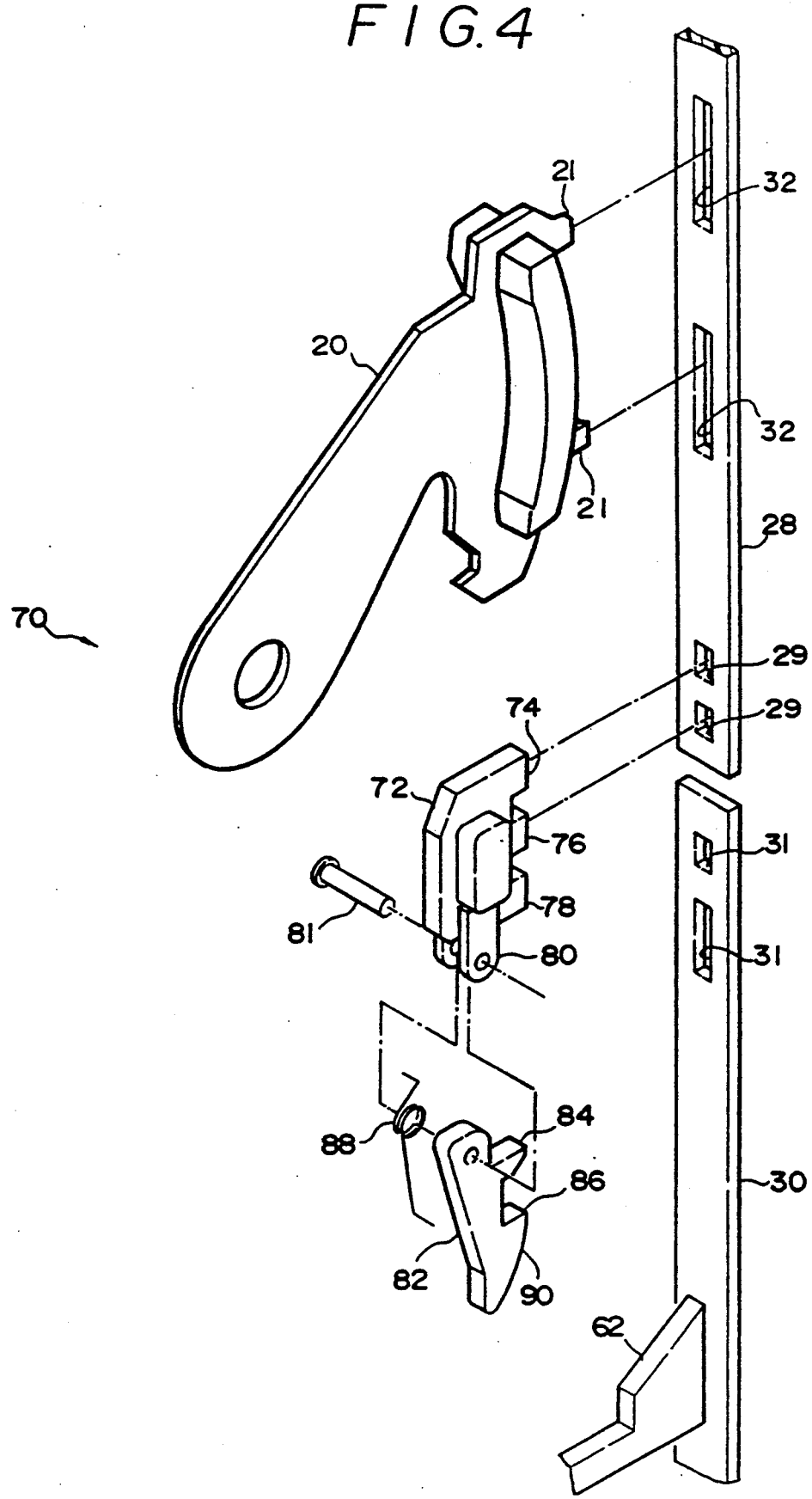
FIG. 4 is an exploded perspective view around the connecting part of tapes of an automatic seat belt system in accordance with the second embodiment of the present invention.

FIG. 4 shows the detail of the connecting part of a tape 28 and a tape 30 of an automatic seat belt system 70 in accordance with the second embodiment of the present invention.

In the automatic seat belt system 70, a lost motion piece 72 is attached on the lower end portion of the tape 28 as a first connecting member. The lost motion piece 72 has a block shape with a pair of protrusions 74, 76 protruding near the one end portion in the longitudinal direction corresponding to openings 29. Similarly to the case of the first embodiment aforementioned, the protrusions 74, 76 are inserted to the openings 29 and thereby, the lost piece 72 is anchored to the tape 28.

An abutting section 78 which protrudes in the same direction with the protrusions 74, 76 is formed on the other end of the lost piece 72 in the longitudinal direction. This abutting section 78 is located further forward position from the tip portion of the tape 28 in a state when the protrusions 74, 76 are inserted to the openings 29 and the lost piece 72 is anchored to the tape 40.

Arm sections 80 are formed protruding from the other end of the lost motion piece 72 in the longitudinal direction along the longitudinal direction of the tape 28. Moreover, a lock piece 82 as a second connecting member is connected to the arm sections 80.

One end of the lock piece 82 is supported by means of a pin 81 in a manner capable of rotating therearound and a pair of engaging sections 84, 86 are formed protruding from near the other end portion of and approximately from the middle of the lock piece 82. Those engaging sections 84, 86 are both formed in a wedge shape and correspond to the openings 31 formed on the upper end portion of the tape 30. The engaging sections 84, 86 are arranged such that they are inserted to the openings 31 when the lock piece 82 rotates around the pin 81. When the engaging sections 84, 86 are inserted to the openings 31, the tape 30 is connected to the lost motion piece 72 through the intermediary of the lock piece 82, thereby causing the tape 32 to be moved in conjunction with the tape 30.

A torsion coil spring 88 is provided around the pin 81. One end of the torsion coil spring 88 is anchored to the lost motion piece 72 and the other end is anchored to the lock piece 82. This causes the torsion coil spring 88 to always urge in such a direction that the engaging sections 84, 86 of the lock piece 82 are inserted to the openings 31 of the tape 30.

A tilt portion 90 which tilts along the traveling direction of the lost motion piece 72 and the tape 28 is formed on the tip portion of the lock piece 82. This tilt portion 90 is capable of engaging with a release piece 62 as a releasing means.

Description will be made hereinafter of the operation of the second embodiment.

Figure 5A:
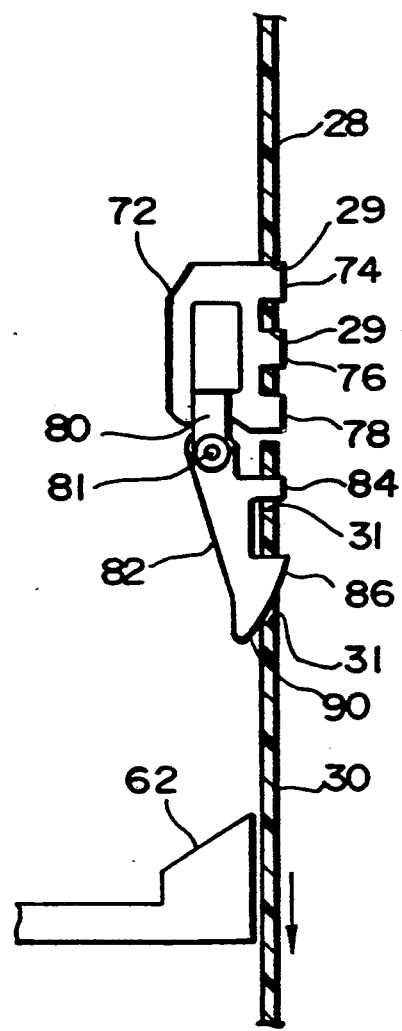
FIGS. 5(A) to 5(D) are sectional views illustrating each connecting condition of operation of a lock piece and tapes in accordance with the second embodiment of the present invention.
Figure 5B:
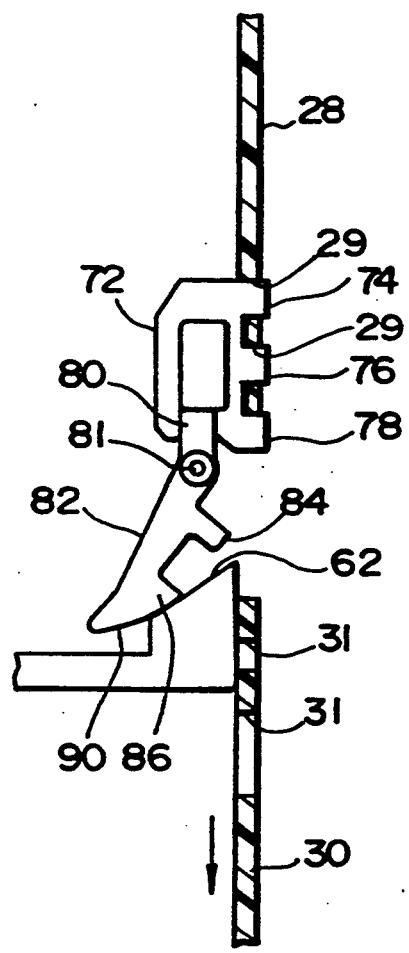

In the second embodiment, similarly to the case in the first embodiment, when the occupant is seated on the seat, the slider 20 is positioned at the vehicle forward end portion of the guide rail 14 and the engaging section 84, 86 of the lock piece 82 are inserted to the most upward section of the openings 31 formed on the tape 30 by means of the urging force of the torsion coil spring 88 (as shown in FIG. 5(A)). Accordingly, the tape 30 is connected to the tape 28 through the intermediary of the lock piece 82 and the lost piece 72. The driving device 64 is also stopped. A wide space has been created between the webbing 24 and the seat, so that the occupant is readily able to seat on the seat.

When the occupant is seated on the seat and the drive device 64 is rotated in the forward direction, the driving force of the driving device 64 is transmitted to the tape 28 through the intermediary of the tape 30, thereby causing a tensile force to be generated on the tape 28. This causes the slider 20 to be moved to the vehicle rearward side along the guide rail 14 and to be retained by the movable plate 36, thereby causing the occupant to be worn by the webbing 24.

At this time, since the lost motion piece 72 is fixed to the tape 28 (the openings 29) by plural points (the protrusions 74, 76) and the lock piece 82 is engaged with the tape 30 (openings 31) by plural points (the engaging sections 84, 86), the connecting part by means of the lost motion piece 72 and the lock piece 82 is assured to have enough strength and the tensile moving force of the tape 30 is faithfully transmitted to the tape 28. Thus the slider 20 is also moved properly.

At this moment, when the slider 20 is retained by the movable plate 36, the release piece 62 abuts against the tilt portion 90 of the lock piece 82 along the movement of the tapes 30 and 28. When the downward movement of the tapes 28 and 30 further progresses, the release piece 62 rotates the lock piece 82 around the pin 81 resisting against the urging force of the torsion coil spring 88 and moves the lock piece 82 in such a direction that the engaging section 84, 86 are released from the openings 31 of the tape 30. This causes the connection of the tape 30 and the tape 28 to be released and the tape 30 is separated from and becomes independent of the tape 28.

Accordingly, also in the second embodiment, even when the movable plate 36 is moved together with the slider 20 and the tape 28 in order to alter the retaining position of the slider 20, the moving force will not be transmitted to the driving device 64 through the intermediary of the tape 30. This allows to move the movable plate 36 to the position where the occupant desires together with the slider 20 and the tape 28 with a small operating force and to readily adjust the webbing wearing height.

Figure 5C:
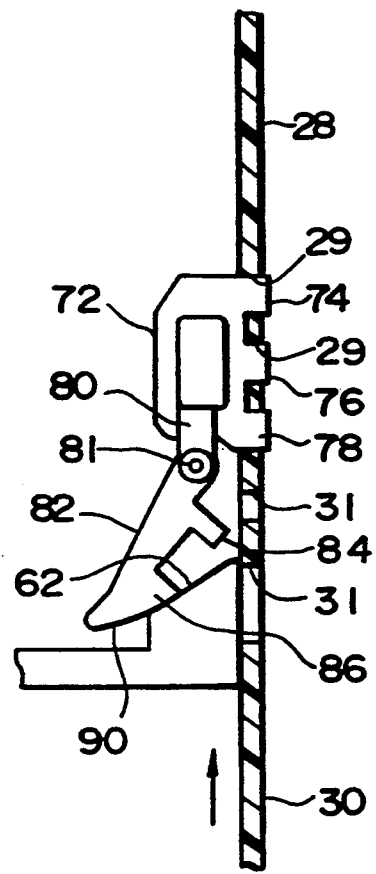
Figure 5D:
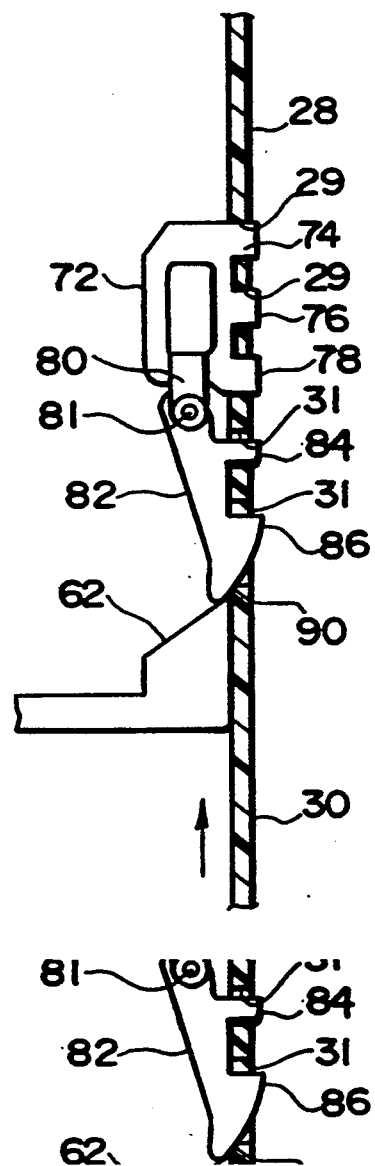

When the occupant releases the wearing of the webbing 24, the tape 30 is moved in the direction reverse to the one during wearing of the webbing 24. When the movement of the tape 30 further progresses in this state, the tip portion of the tape 30 abuts against the abutting section 78 of the lost motion piece 72 and directly presses the abutting section 78 as shown in FIG. 5(C), which causes the pressing moving force of the tape 30 to be transmitted to the tape 28 through the intermediary of the lost motion piece 72. This causes the tape 28 to be moved together with the lost piece 72 and the lock piece 82. Then, along the movement of the lost motion piece 72, the lock piece 82, which has been in a condition of being retained by the release piece 62, gradually rotates around the pin 81 by means of the urging force of the torsion coil spring 88, and the engaging section 84, 86 are inserted to the openings 31 of the tape 30 as shown in FIG. 5(D). This causes the tape 28 to be connected again to the tape 30, and the tape 28 moves to the vehicle forward side together with the slider 20, thereby creating a state wherein the wearing of the webbing 24 is released.

At this time also, as shown in FIG. 5(D), the tape 30 will not abut directly against the tape 28 (tape 30 abuts against and presses the abutting section 78 of the lost motion piece 72), so that the tape 28 and tape 30 will not unnecessarily deflect even in high temperature condition, and the connecting section of the tape 28 and the tape 30 can be assured to have enough strength. Accordingly, the pressing moving force of the tape 30 is faithfully transmitted to the tape 28 and the slider 20 is moved properly.

As described above, it is apparent also in the second embodiment that even when the movable plate 26 is moved together with the slider 20 and the tape 28, the moving force is not transmitted to the driving device 64 through the intermediary of the tape 30 because the connection between the tape 28 and the tape 30 by means of the lost motion piece 72 and the lock piece 82 is released after when the slider 20 is retained by the movable plate 36 and the webbing 24 is worn. Accordingly, this allows the occupant to move the movable plate 36, together with the slider 20 and the tape 28, to the position where he desires with a light operating physical force and to readily adjust the webbing wearing height.

It will also be apparent that the connecting part by means of the lost motion piece 72 and the lock piece 82 is assured to have enough strength and the tensile moving force of the tape 30 is transmitted faithfully to the tape 28 because the lock piece 72 is fixed to the tape 28 by plural points and the lock piece 82 is engaged with the tape 30 by plural points.

It will further be apparent that the pressing moving force of the tape 30 is faithfully transmitted to the tape 28 and the connecting part of the tape 28 and the tape 30 is assured to have enough strength because the tape 30 abuts against the abutting section 78 of the lost motion piece 72 and presses the tape 28 without directly abutting against thereto.

In the second embodiment also, a structure may be adopted wherein three or more protrusions 74, 76 of the lost piece 72 or three or more engaging sections 84, 86 of the lock piece 82 are provided to be connected to the tapes 28 and 30, respectively.

What is claimed is:
1. An automatic seat belt system comprising:
a guide rail disposed in a vehicle, compartment
a slider which is connected to a webbing for restraining an occupant of the vehicle and which is guided by said guide rail in a manner capable of moving between a webbing-application canceling position and a webbing applying position;
a slider retaining member which engages with said slider and retains thereof at the webbing applying position and which is capable of moving along the longitudinal direction of said guide rail while retaining said slider;
a first elongated member which is arranged along the longitudinal direction of said guide rail and a portion of which is anchored to said slider;
a second elongated member whose one end face is faced approximately to an end face of said first elongated member and whose said one end face is moved by a driving force of a driving source in a first direction approaching to said end face of said first elongated member and in a second direction which is reverse direction thereof;
a connecting means comprising; a connecting section connected to said first elongated member by plural points, an abutting section located between said end face of said first elongated member and said one end face of second elongated member, and an engaging section engaged with said second elongated member by plural points in a manner releasable, which moves said slider in the direction of said webbing application canceling position by means of a pressing force through the intermediary of said abutting section and said first elongated member during when said second elongated member is moved in said first direction, and which moves said slider in the direction of said webbing applying position by means of a tensile force through the intermediary of said engaging section and said first elongated member during when said second elongated member is moved in said second direction; and a releasing means which is supported by said slider retaining member and which releases an engagement of said engaging section and said second elongated member at the said webbing applying position of said slider.

2. An automatic seat belt system as claimed in claim 1, wherein a connection of plural points of said first elongated member and said connecting section is made along the longitudinal direction of said first elongated member and an engagement of plural points of said second elongated member and said engaging section is made along the longitudinal direction of said second elongated member.

3. An automatic seat belt system as claimed in claim 2, wherein said connection of plural points is made by inserting protrusions on said connecting section to holes provided on said first elongated member and said engagement of plural points is made by inserting protrusions provided on said engaging section to openings provided on said second elongated member.

4. An automatic seat belt system as claimed in claim 1, wherein said connecting means includes a first member comprising said connecting section and said abutting section and a second member comprising said engaging section.

5. An automatic seat belt system as claimed in claim 4, wherein said connecting means is provided with an urging means for urging in such a direction that said engaging section is engaged with said second elongated member.

6. An automatic seat belt system as claimed in claim 5, wherein said first member is accommodated in a recess provided in said second member and is urged in the direction to be pushed out by means of said urging means, with said engaging direction being same with said pushing direction.

7. An automatic seat belt system as claimed in claim 4, wherein said second member is pivoted by a first member and is urged in a certain rotating direction by said urging means, with said engaging means being same with said certain rotating direction.

8. An automatic seat belt system as claimed in claim 5, wherein said release means includes a pressing section which releases said engaging section from the engagement with said second elongated member by pressing said second member by means of a movement of said slider in the direction of said webbing applying position resisting against an urging force of said urging means.

9. An automatic seat belt system as claimed in claim 8, wherein said pressing section is provided with a tilt face provided to move said second member gradually in such a direction that said engaging section is released from the engagement with said second elongated member along the movement of said slider in the direction of said webbing applying position.

10. An automatic seat belt system comprising:

a guide rail disposed in a vehicle compartment such as to extend in the longitudinal direction of the vehicle, having an extended portion extended downward which is the vehicle rearward end portion thereof being bent downward;

a slider which is connected to a webbing for restraining an occupant of the vehicle and which guided by said guide rail in a manner capable of moving between a webbing-application canceling position and a webbing applying position;

a slider retaining member which engages with said slider and retains thereof at said webbing applying position and which is capable of moving vertically along said extended portion while retaining said slider;

a first elongated member which is arranged along the longitudinal direction of said guide rail and a portion of which is anchored to said slider;

a second elongated member whose one end face is faced approximately to an end face of said first elongated member from the direction heading toward said webbing-application canceling position from said webbing applying position and whose said one end face is moved by a driving force of a driving source in a first direction approaching to said end face of said first elongated member and in a second direction which is reverse direction thereof;

a connecting mechanism comprising; a first member comprising a connecting section connected to said first elongated member by plural points in the longitudinal direction thereof and an abutting section located between said end face of said first elongated member and said one end face of second elongated member, and a second member comprising an engaging section engaged with said second elongated member by plural points in the longitudinal direction thereof in a manner releasable which is supported by said first member, and which moves said slider in the direction of said webbing-application canceling position by means of pressing force through the intermediary of said abutting section and said first elongated member during when said second elongated member is moved in said first direction, and which moves said slider in the direction of said webbing applying position by means of a tensile force through the intermediary of said engaging section and said first elongated member during when said second elongated member is moved in said second direction; and a releasing means which is supported by said slider retaining member and which releases an engagement of said engaging section with said second elongated member by pressing said second member at said webbing applying position of said slider.

11. An automatic seat belt system as claimed in claim 10, wherein the connection of said plural points is made by inserting protrusions provided on said connecting section to holes provided on said first elongated member and an engagement of said plural points is made by inserting protrusions provided on said engaging section to openings provided on said second elongated member.

12. An automatic seat belt system as claimed in claim 11, wherein said connecting mechanism is provided with an urging means which urges in such a direction that said engaging section is engaged with said second elongated member.

13. An automatic seat belt system as claimed in claim 12, wherein said first member is accommodated in a recess provided in said second member and is urged in the direction to be pushed out from said recess by means of said urging means, with said engaging direction being same with said pushing direction.

14. An automatic seat belt system as claimed in claim 12, wherein said second member is provided by a first member and is urged to a certain rotating direction by said urging means, with said engaging direction being same with the said certain rotating direction.

15. An automatic seat belt system as claimed in claim 12, wherein said releasing member is provided with a tilt face provided to move said second member gradually in such a direction that said engaging section is released from the engagement with said second elongated member, against the urging force of said urging means, along the movement of said slider in the direction of said webbing applying position.

16. An automatic seat belt system as claimed in claim 12, wherein said protrusions provided on said second member is provided with a tilt guide face to enable to be inserted readily to said openings provided on said second elongated member.

17. An automatic seat belt system as claimed in claim 10, wherein said first elongated member and said second elongated member are constituted of tape shape members.

18. An automatic seat belt system as claimed in claim 10, wherein the connection of said plural points is made by two points and the engagement of said plural points is made by two points.

* * * * *